No. 827,861. PATENTED AUG. 7, 1906.
W. GARDINER.
SECONDARY BATTERY.
APPLICATION FILED SEPT. 23, 1904.
3 SHEETS—SHEET 1.
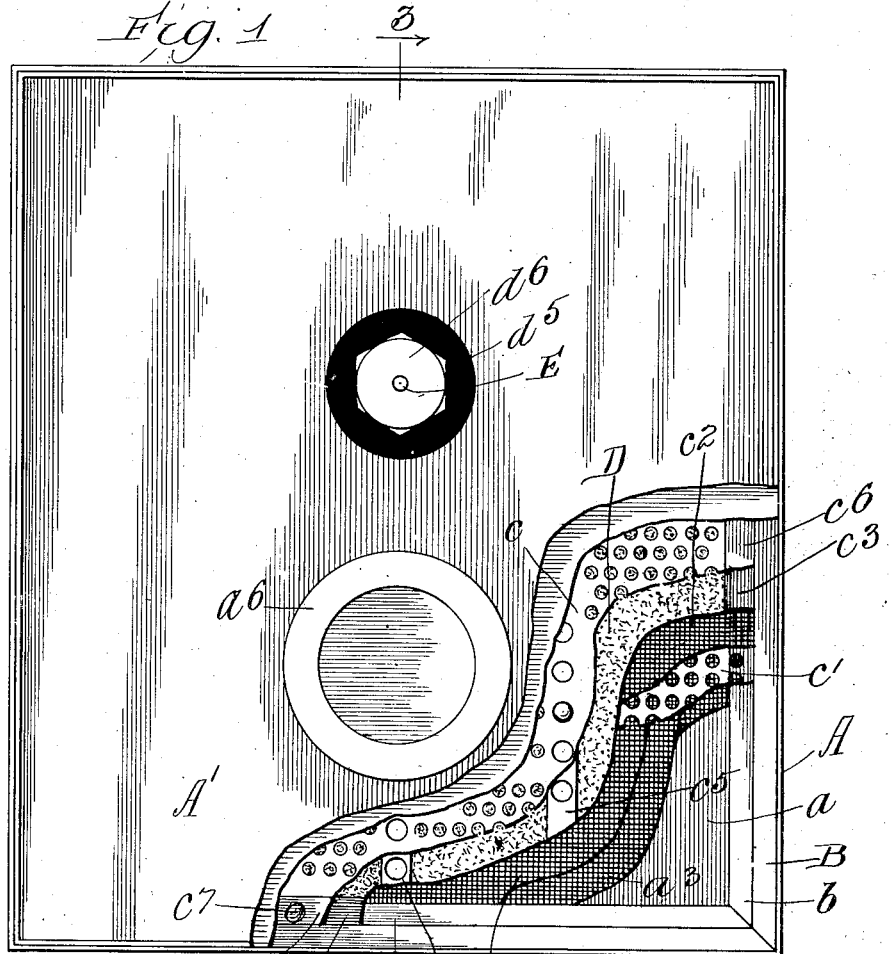
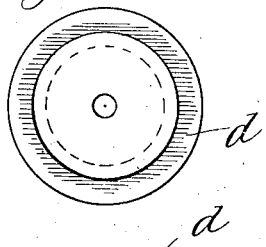
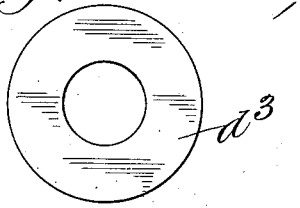
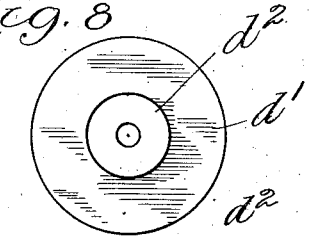

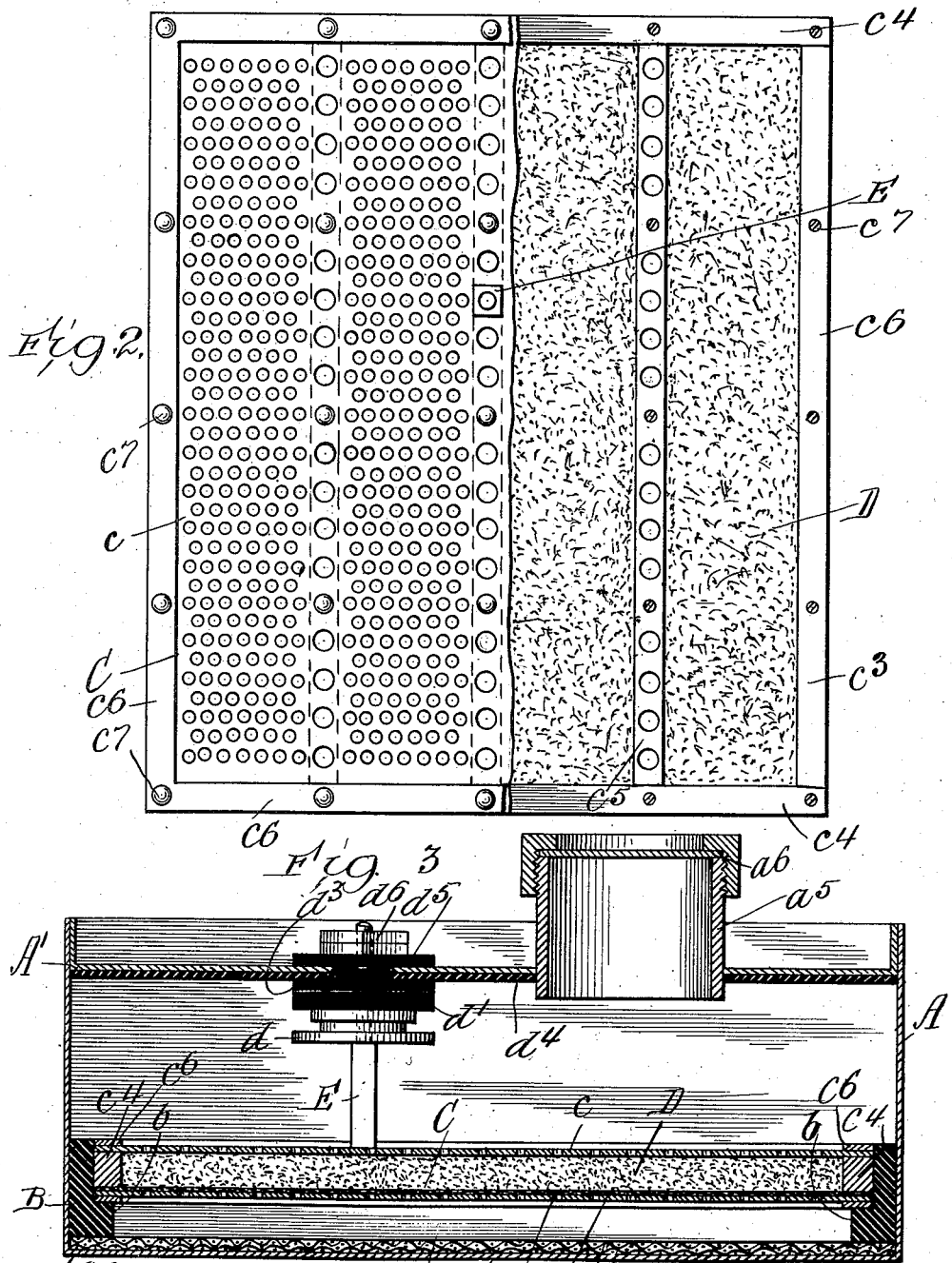

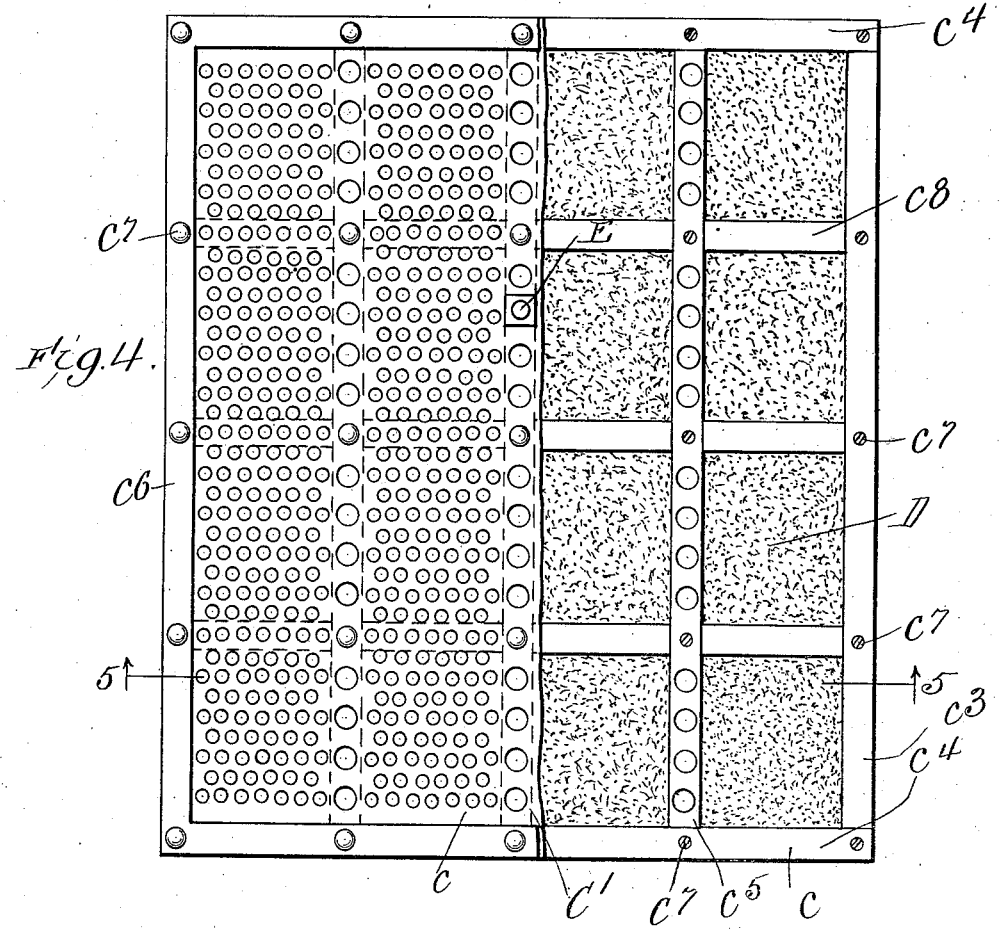
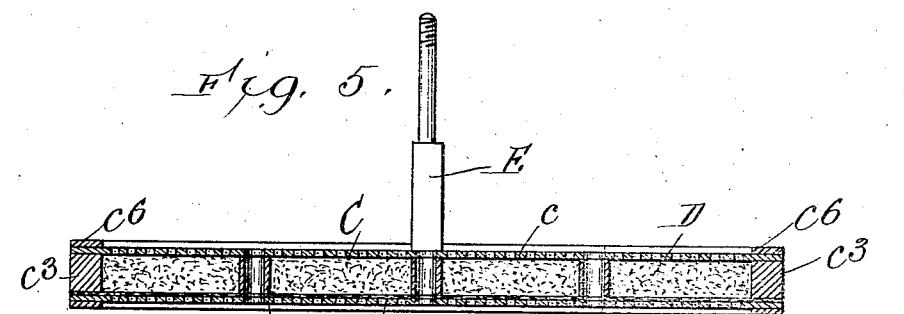

UNITED STATES PATENT OFFICE.

WILLIAM GARDINER, OF CHICAGO, ILLINOIS, ASSIGNOR, BY MESNE ASSIGNMENTS, TO UNIVERSAL ELECTRIC STORAGE BATTERY COMPANY, A CORPORATION OF DELAWARE.

SECONDARY BATTERY.

No. 827,861.    Specification of Letters Patent.    Patented Aug. 7, 1906.

Application filed September 23, 1904. Serial No. 225,563.

*To all whom it may concern:*

Be it known that I, WILLIAM GARDINER, a citizen of the United States, and a resident of the city of Chicago, in the county of Cook and State of Illinois, have invented certain new and useful Improvements in Secondary Batteries; and I do hereby declare that the following is a full, clear, and exact description of the same, reference being had to the accompanying drawings, and to the letters of reference marked thereon, which form a part of this specification.

The batteries heretofore constructed have frequently been objectionable because of the extreme weight due to the use of lead plates, or if other material have been substituted therefor the efficiency has been impaired owing to the vertical arrangement of the elements for plates which have permitted the active material washing therefrom and accumulating in the bottom of the cell, causing a short circuit.

The object of this invention is to provide a secondary cell of light weight and high efficiency and in which material and structure admit of use indefinitely without injury or the necessity of reconstruction of the cell or replenishment of the elements or the electrolyte contained therein.

The invention consists in the matters hereinafter described, and more fully pointed out and defined in the appended claims.

In the drawings, Figure 1 is a fragmentary top plan view of a cell embodying my invention. Fig. 2 is a fragmentary top plan view of the positive-pole element therein. Fig. 3 is a section taken on line 3 3 of Fig. 1. Fig. 4 is a view similar to Fig. 2, but illustrating a slightly-modified construction of the positive-pole element. Fig. 5 is a section taken on line 5 5 of Fig. 4. Fig. 6 is a plan view and a vertical section of one of the washers adapted to secure the positive-pole element and its conductor in place. Fig. 7 presents a similar view of one of the insulating-washers used in securing the positive-pole element and its conductor in place. Fig. 8 illustrates a similar view of the other of said washers.

As shown in said drawings, the battery cell or jar is constructed of sheet metal, such as copper, though other suitable material may be used, and, as shown, is rectangular in form and comparatively shallow in depth.

Extending across and covering the bottom $a$ of the cell A are one or more layers of conducting material adapted to receive the deposit of and to constitute a part of a negative-pole element. Said conducting material, as shown, comprises one or more sheets of wire-net $a^3$ $a^4$, usually copper, cut to fit closely in the bottom of said cell or jar and upon which at the sides and ends of the cell rest separator-strips B. Said separator-strips are of vulcanite or other suitable non-conducting material and afford a continuous raised support, the inner face of which is rabbeted to afford an inwardly-projecting ledge or shoulder $b$, upon which the positive-pole element (indicated as a whole by C) rests and is thereby spaced and insulated from the side and end walls of the receptacle or cell and is supported above the bottom a distance sufficient to afford considerable space between the under side of the positive-pole element and said wire-net. Said positive pole element embraces an upper and lower closely-perforated sheet of metal $c$ $c'$—such as silver, nickel, plated copper, or other metal—not readily acted upon by the electrolyte used and which fit upon the shoulders $b$ of the separator. Upon the lower plate $c'$ is laid a sheet of linen $c^2$ or other porous fabric adapted to permit access to the electrolyte therethrough, but preventing any particles of the active material or materials to become active falling through said perforations into the bottom of the cell. Said upper and lower sheet of metal $c$ $c'$ are spaced a uniform distance apart by space-bars $c^3$ and $c^4$ at the sides and ends of the element, and intermediate space-bars $c^5$ are arranged parallel with said side space-bars $c^3$ and extend longitudinally of the plate. On each side of said element corresponding in position with the end and side space-bars $c^3$ $c^4$ are reinforcing or binding strips $c^6$, through which and said sheets and the space-bars extend rivets $c^7$, which rigidly secure the structure thus formed together. Relatively large apertures are provided through said metal and fabric sheets and the intermediate space-bars affording a free passage for the electrolyte through said element.

The spaces intermediate the space-bars are filled with a material to become active consisting of a mass of sponge metal, the character of which of course varies with the character of the electrolyte used. In the present instance the material to become active consists of an amalgam formed of a mixture of sponge-nickel and silver and mercury which is compressed into a firm tablet D, which entirely fills the spaces between said space-bars.

If preferred, the tablets D may be divided transversely by intermediate spacing-bars $c^3$, which are inserted in place as the tablets are placed in the element. A conductor E is rigidly secured to said element and extends upwardly therefrom through the cover-plate A'. Said conductor is provided with a shoulder at a point below the cover-plate, upon which rests a relatively large washer $d$ and upon which is secured an insulating-washer $d'$, provided with a central hub $d^2$, which extends upwardly through the insulating-washer $d^3$, carried thereon, and through the cover-plate A' and insuating-sheet $d^4$ below the same, and on the top of which are binding-nuts $d^6$, secured on the upper end of said conductor adapted to secure a conductor-wire thereto in the usual manner. If the cell or receptacle is constructed of copper or other conducting metal, the negative conductor may be attached directly to said cover or to any portion of the receptacle, as shown in Fig. 1.

The electrolyte may be of any suitable kind. If the positive-pole element contains silver, nickel, and mercury or either silver or nickel, the electrolyte may be a solution of caustic alkali, such as hydrate of soda or potassium holding a portion of oxid of zinc or of cadmium. This is poured into the cell or jar through a filling-pipe $a^5$ in the cover which, as shown, is provided with a screw-cap $a^6$ in the usual manner.

The operation is as follows: The zinc or cadmium oxid accumulates upon and adheres to the wire-net at the bottom of the cell below the positive-pole element, and completes the negative-pole element. When cadmium is used in the form of an oxid, it does not dissolve in the electrolyte, hence is not displaced from the wire-net.

Obviously many variations in the construction and arrangements of parts may be made without departing from the principles of my invention. I therefore do not purpose limiting this invention otherwise than necessitated by the prior art.

I claim as my invention—

1. In an accumulator-cell, a positive-pole element comprising outer retaining-walls of conducting material, spacing-bars therebetween, a sheet of fabric on the inner face of the lower wall, binding-strips secured around the edges of the walls and material to become active carried between said walls, there being registering apertures through said walls and space-bars.

2. In an accumulator, a positive-pole element comprising apertured plates, space-bars therebetween having apertures therethrough transversely of the element and registering with apertures in said plates for the free circulation of the electrolyte and binding-strips rigidly engaged about the margins of said plates and binding the same together.

3. In an accumulator-cell, horizontally-disposed apertured plates having sponge metal therebetween, space-bars between said plates, a layer of fabric between one of said plates and the sponge metal, and wire-net in the bottom of the cell, there being apertures through said plates and space-bars for the passage of the electrolyte without contact with the sponge metal.

4. An accumulator-cell, of conducting material, a reticulated sheet in the bottom thereof, rabbeted insulating-strips thereon and a positive-pole element seated in said strips comprising an upper and a lower perforated sheet and tablets of material to become active engaged between said sheets, said element having large apertures extending therethrough for the passage of the electrolyte out of contact with said tablets.

5. An accumulator-cell of conducting material, wire-net on the bottom thereof, insulating-strips on said wire-net, and adjacent the sides of the cell and a positive-pole element seated thereon comprising apertured plates, space-bars between said plates binding-strips about the margin of the plates and material to become active carried between said plates, there being relatively large apertures through the element for the free passage of the electrolyte without contact with said material.

6. In a secondary-battery cell, sheets of wire-netting in the bottom of the cell, a horizontal element supported above the same comprising lower sheets, one fabric of fibrous material, the other of perforated metal at the bottom of the same, compressed sponge metal supported thereon, a sheet of perforated metal affording the top of the element, spacing-bars filling the ends and sides of said element, rivets engaging said sheets and bars together and a conductor connected to the element.

In testimony whereof I have hereunto subscribed my name in the presence of two subscribing witnesses.

WILLIAM GARDINER.

Witnesses:
 C. W. HILLS,
 W. W. WITHENBURY.